United States Patent [19]

Nishida et al.

[11] Patent Number: 5,029,123
[45] Date of Patent: Jul. 2, 1991

[54] INFORMATION PROCESSING DEVICE CAPABLE OF INDICATING PERFORMANCE

[75] Inventors: Masato Nishida, Tokyo; Takahiko Uesugi, Yamanashi, both of Japan

[73] Assignee: NEC Corporation, Tokyo, Japan

[21] Appl. No.: 432,670

[22] Filed: Nov. 7, 1989

[30] Foreign Application Priority Data

Nov. 7, 1988 [JP] Japan ............................... 63-279409

[51] Int. Cl.$^5$ ........................... G06F 7/50; G06F 7/38
[52] U.S. Cl. ..................................... 364/768; 364/748
[58] Field of Search ............... 364/748, 736, 760, 768, 364/200 MS File, 900 MS File, 736.5

[56] References Cited

U.S. PATENT DOCUMENTS 3,920,962  11/1975  Mayer et al. ......................... 364/768
4,907,185   3/1990  Umetani ............................... 364/748

Primary Examiner—Dale M. Shaw
Assistant Examiner—Long T. Nguyen
Attorney, Agent, or Firm—Foley & Lardner

[57] ABSTRACT

In an information processing device for use in indicating an operation number of floating point operation elements, such as either vector elements of each vector instruction or scalar instructions, the floating point operation elements are successively counted by an adder and a register to produce operation number signals representative of the results of counting. The operation number signals are periodically read out of the register as preceding and following operation number signals at preceding and following ones of periodical signals sent as a time signal from a digital timer, respectively, and are held in registers. A subtracter subtracts the preceding operation number from the following operation number to calculate a difference signal between the preceding and the following operation numbers and to provide the operation number per unit time. The difference signal is visually displayed on a display unit in real time. Alternatively, each of the preceding and the following operation number signals may be stored in a scalar register together with the time signal.

3 Claims, 2 Drawing Sheets

INFORMATION PROCESSING DEVICE CAPABLE OF INDICATING PERFORMANCE

BACKGROUND OF THE INVENTION

This invention relates to an information processing device which is capable of indicating the performance thereof during execution of a vector instruction and a succession of scalar instructions.

In general, the performance of an information processing device of the type described can be evaluated by throughput represented by factors, such as floating point operations per second (FLOPS). The floating point operations per second can be obtained by calculating floating point operation elements per unit time, namely, a second. It is to be noted that an element number of the floating point operation elements to be calculated may be recognized as the number of scalar instructions or as the number of vector elements appearing on executing a single vector instruction.

In order to calculate such floating point operations per second, a conventional information processing device executes a program which has an operation measurement part intermediate leading and trailing instructions, each of which detects or reads instant of time.

On calculating the floating point operations per second, the operation measurement part is executed after a start time instant is detected by executing the leading instruction. After execution of the operation measurement part, an end time instant is detected by executing the trailing instruction. Subsequently, a time difference is calculated between the leading and the trailing instructions to attain an execution time taken to execute the operation measurement part of the program. On the other hand, calculation could be manually carried out concerning the total number of the floating point operation elements included in the operation measurement part. Under these circumstances, the floating point operations per second are calculated by dividing the total number of the floating point operation elements by the execution time of the operation measurement part.

However, it is not always easy to calculate the total number of the floating point operation elements in the operation measurement part. For example, an instruction analysis routine must be prepared to calculate the total number of the floating point operation elements included in the operation measurement part. Due to the necessity of such an instruction analysis routine, it is very difficult to indicate or visually display the floating point operations per second in a real time or on demand basis.

SUMMARY OF THE INVENTION

It is an object of this invention to provide an information processing device which is capable of indicating floating point operations per second on demand.

It is another object of this invention to provide an information processing device of the type described, which is capable of visually displaying the floating point operations per second in real time.

An information processing device to which this invention is applicable is for use in indicating an operation number of floating point operation elements to be processed during a unit time in the information processing device. Each of the floating point operation elements is specified by a numeral of a floating point representation. According to an aspect of this invention, the information processing device comprises a signal producing unit for producing a sequence of periodical signals appearing at a predetermined period, a counting unit for successively counting the floating point operation elements to produce a count signal indicative of a result of the counting, and a processing unit, connected to the signal producing unit and counting unit, for processing the sequence of periodical signals and the number signal into a processed signal representative of said operation number. According to another aspect of this invention, the information processing device comprises a time signal producing unit for successively producing a time signal representative of time instants, a counting unit for successively counting each of the floating point operation elements to produce a count signal indicative of a result of the counting, and holding unit, connected to the signal producing unit and the counting unit, for storing the time signal and the count signal as a pair so that said operation number can be calculated by the use of the time signal and the count signal stored in said memorizing unit.

DESCRIPTION OF THE PREFERRED EMBODIMENT

Figure 1:
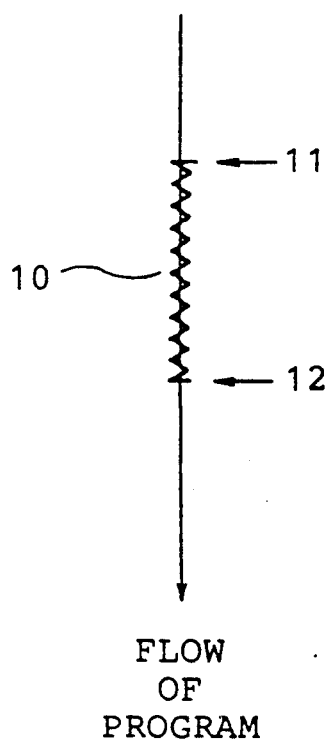
FIG. 1 is a flow chart for use in describing a conventional method, of indicating an operation number of floating point operation elements.

Referring to FIG. 1, a description follows about a conventional method of calculating floating point operations per second in an information processing device in order to facilitate an understanding of this invention. To this end, a program is used which includes an operation measurement part 10. It is assumed that the operation measurement part 10 includes floating point operation elements, an operation number of which is manually calculated in advance. The operation measurement part 10 is preceded by a leading instruction 11 and followed by a trailing instruction 12. Both the leading instructional and the trailing instruction 12 serve to access a clock included in the information processing device to indicate a time instant and to extract the time instant from the clock.

Under the circumstances, a start time instant of the operation measurement part is detected by the leading instruction. Thereafter, the operation measurement part 10 is executed and is followed by the trailing instruction 12 to detect an end time instant of the operation measurement part 10. A time difference is calculated between the leading and the trailing time instants to obtain an execution time of the operation measurement part 10 within the information processing device. The operation number included in the operation measurement part 10 is divided by the execution time to calculate floating point operations per second. Thus, the floating point operations per second are given by the conventional method.

From this fact, it is readily understood that the operation number of the floating point operation elements should be detected in the operation measurement part 10 in advance. To this end, an instruction analysis routine must be prepared in the program, as described previously.

Figure 2:
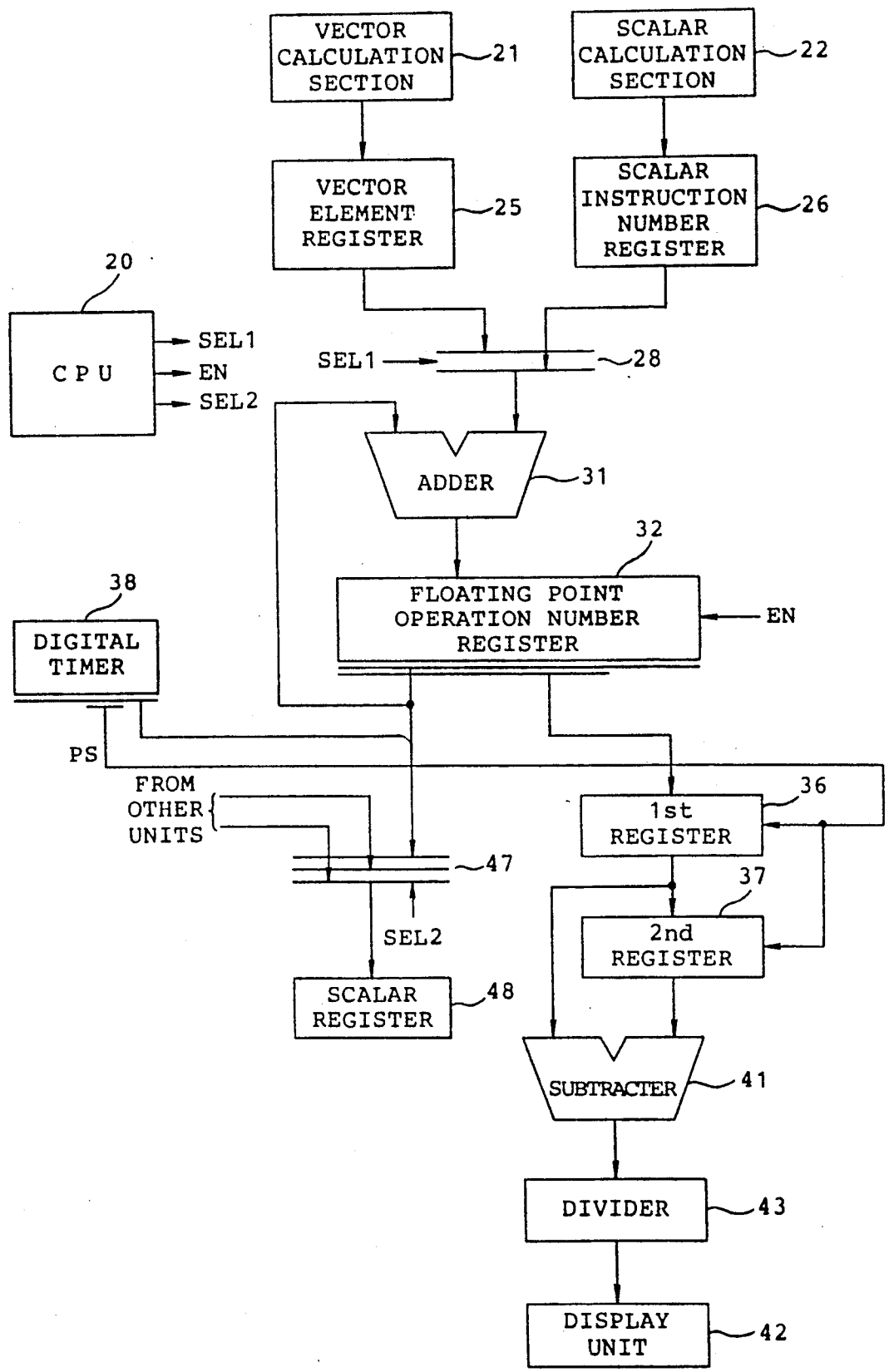
FIG. 2 is a block diagram of an information processing device according to a preferred embodiment of this invention.

Referring to FIG. 2, an information processing device according to a preferred embodiment of this invention carries out a wide variety of operations under control of a central processing unit 20 included therein and is for use in combination with a vector calculation section 21 and a scalar calculation section 22 which execute vector and scalar instructions, respectively, provided from the central processing device 20 in accordance with a program.

The vector calculation section 21 carries out calculations about a sequence of vector elements in response to each of the vector instructions and produces an element number signal representative of an element number each time when each of the vector instructions is processed in the vector calculation section 21. The element number signal is sent to a vector element number register 25 to be kept therein.

On the other hand, the scalar calculation section 22 carries out operations in response to the scalar instructions, respectively. In other words, the operations in the scalar calculation section 22 are equal in number to the scalar instructions. Accordingly, a single instruction count signal is produced by the scalar calculation section 22 in a known manner each time when a single one of the scalar instructions is processed in the scalar calculation section 22. Thereafter, the single instruction count signal is sent to a scalar instruction number register 26 to be kept therein.

The element number signal and the single instruction count signal are delivered from the vector element number register 25 and the scalar instruction number register 26 to a first selector 28 controlled by a first selection signal SEL1 sent from the central processing unit 20. At any rate, either the element number signal or the single instruction count signal is selected by the first selector 28 and is produced as a selected number signal.

The selected number signal is supplied to an adder 31 which is connected to a floating point operation number register 32 of 64 bits. The adder 31 supplies an adder output signal to the floating point operation number register 32. The floating point operation number register 32 is connected to both the adder 31 and a first register 36 connected to a second register 37.

Responsive to an enable signal EN supplied from the central processing unit 20, the floating point operation number register 32 stores the adder output signal and sends a register output signal to the adder 31. The enable signal EN is produced at each selected number signal. In this event, the adder 31 sums up the selected number signal and the register output signal each time when the selected number signal is received by the adder 31. Under the circumstances, the selected number signal is successively counted up by the adder 31 and produced through the floating point operation number register 32 as a result of the counting. The result of the counting is delivered from the floating point operation number register 32 as the register output signal. Thus, the register output signal is representative of an element number of the vector elements and an instruction number of the scalar instructions when the vector and the scalar instruction are executed, respectively, and is produced as an operation number of the floating point operation elements. Therefore, the register output signal may be called an operation number signal representative of the operation number of the floating point operation elements. In this connection, a combination of the vector element register 25, the scalar instruction number register 26, the selector 28, the adder 31, and the floating point operation number register 32 may be referred to as a counter circuit for counting the floating point operation elements.

The illustrated information processing device comprises a digital timer 38 which is energized at the beginning of the program and which serves to produce a time signal successively changed in response to a sequence of clock pulses. The time signal is representative of time instants specified by hours, minutes, seconds, milliseconds, and microseconds. A part of the time signal is successively produced as each only of the periodical signals PS at a predetermined period of, for example, 32 milliseconds. Each periodical signal is delivered from the digital timer 38 to the first and the second registers 36 and 37.

Supplied with a preceding one of the periodical signals PS, the first register 36 is loaded with an upper significant part of the register output signal, namely, the operation number signal. Such an upper significant part of the register output signal indicates the operation number of the floating point operation elements at a unit number of kilo- or mega-FLOPS and will be called a preceding count signal or preceding operation number signal representative of the operation number appearing on production of the preceding periodical signal. After production of the preceding number signal and the preceding periodical signal, the floating point operation number register 32 and the digital timer 38 are successively counted up in the above-mentioned manner.

Under the circumstances, when a following one of the periodical signals PS is delivered from the digital timer 38 to both the first and the second registers 36 and 37, a following one of the operation number signals is sent as a following count signal from the floating point operation number register 32 to the first register 36 while the preceding operation number signal is sent from the first register 36 to the second register 37 to be stored therein.

Thus, the preceding and the following operation number signals are supplied from the second and the first registers 36 and 37 to a subtracter 41. Responsive to the preceding and the following operation number signals read out of the second and the first registers, respectively, the subtracter 41 subtracts the preceding operation number signal from the following operation number signal to produce a difference signal representative of a difference between the preceding and the following operation number signals.

When the periodical signals PS are produced at a unit time of, for example, 1 second, the difference signal represents an operation number of the floating point operation elements per unit time. In this case, the difference signal may be directly sent from the subtracter 41 to a display unit 42 as a processed signal representative of a result of processing and is visually displayed on the display unit 42.

On the other hand, when the periodical signals are produced at a time interval different from the unit time, the operation number of the floating point operation elements per unit time can be obtained by dividing the difference signal by the time interval by the use of a divider 43 and is sent to the display unit 42 as a processed signal.

At any rate, it is possible with the above-mentioned structure to display the operation number of the floating point operation elements in real time.

Moreover, the illustrated information processing device comprises a second selector 47 which is operable in response to a second selection signal SEL2 sent from the central processing unit 20 and which is connected to both the floating point operation number register 32 and the digital timer 38. In addition, the second selector 47 is also connected to any other units (not shown) which are included in the information processing device and which will not be described any further because operations of the other units are not related to the present invention. At any rate, the second selector 47 serves to supply a selector output signal to a scalar register 48.

Now, it is assumed that the second selector 47 selects, in response to the second selection signal SEL2, the time signal from the digital timer 38 and the operation number signal which is stored in floating point operation number register 32. Such a second selection signal SEL2 is produced when the central processing unit 20 executes an instruction for transferring the operation number signal kept in the register 32 to the scalar register 48 to store the operation number signal in the scalar register 48. In this case, the time signal and the operation number signal are stored as a pair in the scalar register 48. The time signal and the operation number signal memorized in the scalar register 48 can be analyzed later by the use of software to calculate the operation number of the floating point operation elements per unit time. From this fact, it is readily understood that such storage into the scalar register 48 may be asynchronous with a display operation of the operation number carried out in real time.

While this invention has thus far been described in conjunction with a preferred embodiment thereof, it will readily be possible for those skilled in the art to put this invention into practice in various other ways. For example, the information processing device may selectively carry out the display operation of the operation number and the storage of the time signal and the operation number signal into the scalar register 48. In other words, both the display operation and the storage may not always be carried out in the information processing device.

What is claimed is:

1. An information processing device for use in indicating an operation number of floating point operation elements to be processed during a unit time in said information processing device, each of said floating point operation elements being specified by a numeral of a floating point representation, said information device comprising:

signal producing means for producing a sequence of periodical signals appearing at a predetermined period, counting means for successively counting said floating point operation elements to produce a count signal indicative of a result of counting, and processing means, connected to said signal producing means and said counting means, for processing said sequence of periodical signals and said count signal into a processed signal representative of said operation number.

2. An information processing device as claimed in claim 1, wherein said periodical signals include preceding periodical signals and following periodical signals of said periodical signals while said count signal is produced as a preceding count signal and a following count signal from said counting means in synchronism with said preceding periodical signals and said following periodical signals of said periodical signals, respectively, and wherein said processing means comprises:

holding means, connected to said signal producing means and said counting means and supplied with said preceding periodical signals and said following periodical signals of said periodical signals and said preceding count signal and said following count signal, for holding said preceding count signal and said following count signal in response to said preceding periodical signals and said following periodical signals of said periodical signals, respectively;

subtracting means, connected to said holding means and supplied with said preceding and said following count signal read out of said holding means, for subtracting said preceding count signal from said following count signal to produce a difference signal representative of a difference between said preceding count signal and said following count signal; and means, connected to said subtracting means, for producing said difference signal as said processed signal.

3. An information processing device as claimed in claim 2, further comprising:

displaying means, connected to said subtracting means, for visually displaying said difference signal in real time.

* * * * *